No. 692,134. Patented Jan. 28, 1902.
G. HALL & M. T. BEDFORD.
SHEAF FORK.
(Application filed Apr. 8, 1901.)
(No Model.)

WITNESSES:
F. L. Ourand
Frank G. Radelfinger

INVENTORS:
George Hall
Milton T. Bedford
BY
Louis Bagger & Co.
ATTORNEYS.

UNITED STATES PATENT OFFICE.

GEORGE HALL AND MILTON T. BEDFORD, OF LIMA, OHIO.

SHEAF-FORK.

SPECIFICATION forming part of Letters Patent No. 692,134, dated January 28, 1902.

Application filed April 8, 1901. Serial No. 54,882. (No model.)

*To all whom it may concern:*

Be it known that we, GEORGE HALL and MILTON T. BEDFORD, citizens of the United States, residing at Lima, in the county of Allen and State of Ohio, have invented new and useful Improvements in Sheaf-Forks, of which the following is a specification.

Our invention relates to forks, or more specifically to forks for handling sheaves or fodder in bundles; and the object of the same is to construct a fork which shall be simple in construction and especially convenient for picking bundles off the ground. This object and these advantages are accomplished by the simple and novel construction described in this specification and claimed, and illustrated in the accompanying drawings, forming a part thereof, in which—

Figure 1:
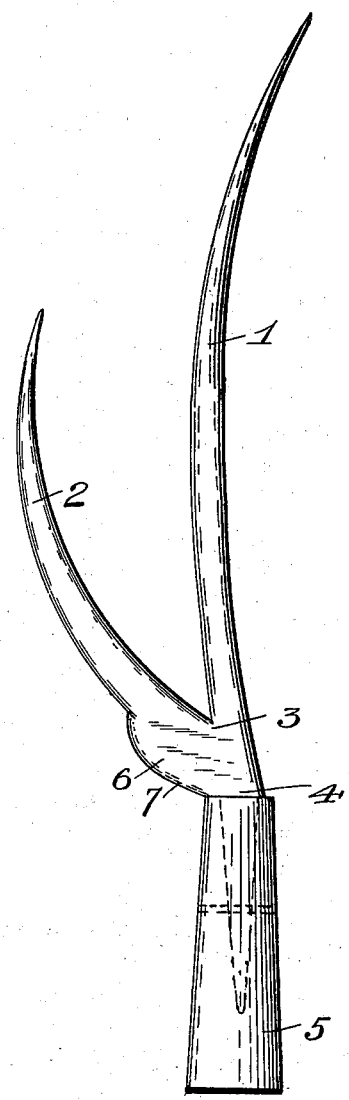
Figure 2:
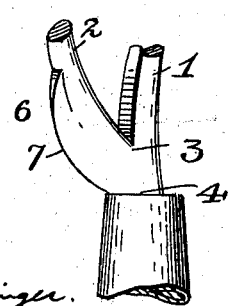

Figure 1 is a side elevation of our fork. Fig. 2 is a detail of the band-cutter.

Our fork comprises two tines, a long and a short one, (designated by the numerals 1 and 2, respectively.) The long tine 1 is tapering, upwardly curved, and is located above and in the same vertical plane with the short tine 2. The short tine 2 is also tapering and upwardly curved and of about one-half the length of the long tine 1. The two tines are united at 3 to form a shank 4, which is inserted in a handle 5. At the rear end of the tine 2, on the under side thereof adjacent to the handle 5, is a band-cutter 6, which is formed integral with the tine 2 and consists of a rounded lug beveled off or sharpened at 7 to a knife-edge.

In using the fork it is held by the handle 5 in such a position that the two tines will be in the same vertical plane. To pick up a bundle, the fork is inserted therein up to the shank, when the bundle will be securely held against rotation by the short tine 2. The short tine very much facilitates the picking up of bundles, as it prevents the fork gouging into the ground. The fork is also much stronger than an ordinary two-tined fork. To cut bands with the cutter 6, the band is first engaged by a chopping-like movement of the fork and jerked sharply toward one, thereby bringing the cutter 6 into contact with the band and severing it.

We do not wish to be limited as to the precise details of construction, as these may be modified in many particulars without departing from the spirit of our invention.

Having thus described our invention, what we claim as new, and wish to secure by Letters Patent, is—

1. A sheaf-fork consisting of two upwardly-curved tines located in the same vertical plane, when the fork is in use, substantially as described.

2. A sheaf-fork, comprising an upper, upwardly-curved long tine, and a lower upwardly-curved shorter tine located in the same vertical plane as the said upper tine, substantially as described.

In testimony whereof we have hereunto set our hands in presence of two subscribing witnesses.

GEORGE HALL.
MILTON T. BEDFORD.

Witnesses:
CHLO. KEPLAR,
FRANCIS M. DECKER.